United States Patent [19]

Brann et al.

[11] Patent Number: 5,386,542
[45] Date of Patent: Jan. 31, 1995

[54] SYSTEM FOR GENERATING A TIME REFERENCE VALUE IN THE MAC LAYER OF AN ISO/OSI COMMUNICATIONS MODEL AMONG A PLURALITY OF NODES

[75] Inventors: J. Joseph Brann, Manassas, Va.; Thomas C. Ralya, Monroeville, Pa.

[73] Assignee: International Business Machines Corporation, Armonk, N.Y.

[21] Appl. No.: 785,713

[22] Filed: Oct. 31, 1991

[51] Int. Cl.⁶ .................................... H04L 7/04
[52] U.S. Cl. ........................ 395/550; 395/200; 375/107; 364/269; 364/271.2; 364/242.94; 364/DIG. 1
[58] Field of Search ............ 395/550, 200; 375/107; 370/100.1, 60

[56] References Cited

U.S. PATENT DOCUMENTS 4,894,846  1/1990  Fine .................................. 375/107

FOREIGN PATENT DOCUMENTS 0430053  6/1991  European Pat. Off. .
WO8500441  1/1985  WIPO .

OTHER PUBLICATIONS

An American National Standard, IEEE Standards for Local Area Networks, "Token Ring Access Method and Physical Layer Specifications," published by The Institute of Electrical and Elctronics Engineers, Inc., NY, N.Y., Apr. 29, 1985, pp. 27–29.

Flaviu Cristian, "A Probabilistic Approach to Distributed Clock Sychronization," IEEE, 1989, pp. 288–296.

D. L. Mills, "Network Time Protocol (Ver. 2) Specification and Implementation," Electrical Engineering Dept., U. of Delaware, Rev. Apr. 12, 1989, pp. 1–30.

Primary Examiner—Thomas C. Lee
Assistant Examiner—Sang Hui Kim
Attorney, Agent, or Firm—Joseph C. Redmond, Jr.; Mark A. Wurm

[57] ABSTRACT

A Time Reference Manager for providing a time reference value to the nodes of a ring topology local area network. A time reference is implemented on a distributed system data bus at a low level interface to provide highly accurate time reference values at each node of the LAN with no settling time required. One node on the network is designated as the Time Reference Manager and broadcasts the Time Reference Protocol data around the ring of the LAN network. Time delay correction is provided by an algorithm performed in a time reference software process. Clock accuracy is selectable by the number of bits used in the clock-counter.

5 Claims, 4 Drawing Sheets

FIG. 1
PRIOR ART

| LAYER | FUNCTION |
| --- | --- |
| 1-PHYSICAL | CONCERNS THE TRANSMISSION OF UNSTRUCTURED BIT STREAM OVER PHYSICAL MEDIUM; DEALS WITH THE MECHANICAL, ELECTRICAL, FUNCTIONAL, AND PROCEDURAL CHARACTERISTICS TO ACCESS THE PHYSICAL MEDIUM. |
| 2-DATA LINK | PROVIDES FOR THE RELIABLE TRANSFER OF INFORMATION ACROSS THE PHYSICAL LINK; SENDS BLOCKS OF DATA (FRAMES) WITH THE NECESSARY SYNCHRONIZATION, ERROR CONTROL, AND FLOW CONTROL. |
| 3-NETWORK | PROVIDES UPPER LAYERS WITH INDEPENDENCE FROM THE DATA TRANSMISSION AND SWITCHING TECHNOLOGIES USED TO CONNECT SYSTEMS; RESPONSIBLE FOR ESTABLISHING, MAINTAINING, AND TERMINATING CONNECTIONS. |
| 4-TRANSPORTATION | PROVIDES RELIABLE, TRANSPARENT TRANSFER OF DATA ENDPOINTS; PROVIDES END-TO-END ERROR RECOVERY AND FLOW CONTROL. |
| 5-SESSION | PROVIDES THE CONTROL STRUCTURE FOR COMMUNICATION BETWEEN APPLICATIONS; ESTABLISHES, MANAGES, AND TERMINATES CONNECTIONS (SESSIONS) BETWEEN COOPERATING APPLICATIONS. |
| 6-PRESENTATION | PROVIDES INDEPENDENCE TO THE APPLICATION PROCESSES FROM DIFFERENCES IN DATA REPRESENTATION (SYNTAX). |
| 7-APPLICATION | PROVIDES ACCESS TO THE OSI ENVIRONMENT FOR USERS AND ALSO PROVIDES DISTRIBUTED INFORMATION SERVICES. |

SYSTEM FOR GENERATING A TIME REFERENCE VALUE IN THE MAC LAYER OF AN ISO/OSI COMMUNICATIONS MODEL AMONG A PLURALITY OF NODES

BACKGROUND OF THE INVENTION

1. Technical Field

The invention generally relates to the development of a common time reference value at all nodes on a local area network and more specifically relates to real time referencing on a ring topology local area network.

2. Background Art

The development of an accurate common time reference value at all the nodes on a local area network (LAN) is becoming increasingly important, particularly as the processing of a system becomes more distributed and takes on the characteristics of being "real time." There have been various schemes proposed for the distribution of a common time value to all the nodes on a LAN. Many of these operate as time reference software processes at the application layer (layer 7) of the International Standards Organization (ISO) Open Systems Interface (OSI) 7-layer communication model. FIG. 1 from "Computer Networks" by Tannenbaum, Prentice Hall 1988, defines the names and capabilities of the 7 layers of the ISO/OSI communications model. According to this model two or more layer 7 application processes communicate by utilizing the services provided by the lower layers of the model. Layer 1 represents the physical media which interconnects the nodes on a LAN. A message sent from one application process to another progresses down through layers 6,5,4,3 and 2 before being placed on the interconnecting media at layer 1. The message then traverses the physical media to the node(s) to which it was addressed, and then must traverse layers 2,3,4,5, and 6 before being presented to the target layer 7 application process(es). This communication path is graphically depicted in FIG. 2.

A software process operating at layer 7 of the ISO/OSI model does not have control nor visibility into the amount of software, firmware, and/or hardware processing time is expended in the transmission and reception of a message through the lower layers of the ISO/OSI communications model. As a consequence, a time reference value transmitted in a message from one node on a LAN will be offset considerably from the correct value of the current time when the message is received at a layer 7 time reference software process at other nodes on the LAN.

A report by David L. Mills entitled "Network Time Protocol Version 2 Specification and Implementation" is a sample of the current state-of-the-art in the area of network time distribution. However, methods such as those described by Mills have settling out times that can exceed 24 hours or more with one or two hours being typical. "A Probabilistic Approach to Distributed Clock Synchronization" by Falviu Cristian describes a second current state-of-the-art mechanism for the establishment of a system wide common time value. The Cristian process also operates at the application layer of the ISO/OSI model, and is not deterministic.

OBJECTS OF THE INVENTION

It is an object of the invention to provide a time reference value to all the nodes of a data processing system interconnected by a local area network. It is desired that no settling time is required for distribution of the time reference value. The time reference value can be implemented to a high degree of accuracy.

SUMMARY OF THE INVENTION

The present invention is an architecture consisting of 1) a time reference manager, 2) changes to the LAN adapter transmit and receive state machines which control the processing of frames on a local area network, 3) algorithms to be performed in a time reference software process in a host processor, and 4) a time reference message format. The purpose of the architecture is to develop a consistent time reference value at all the nodes on a local area network. A time reference mechanism contained in this invention is implemented at a low level interface to provide highly accurate time reference values at each node with no settling time required. One node on a network is designated the time reference manager and periodically broadcasts the time reference protocol data unit on the network. The time reference protocol data unit is processed by the modified transmit and receive state machines at each node until the data unit returns to the issuing node.

BRIEF DESCRIPTION OF THE DRAWINGS

These and other objects, features and advantages will be more fully appreciated with reference to the accompanying figures.

FIG. 1 is a prior art table of the Open Systems Interface protocol.

DETAILED DESCRIPTION OF THE INVENTION

Figure 2:
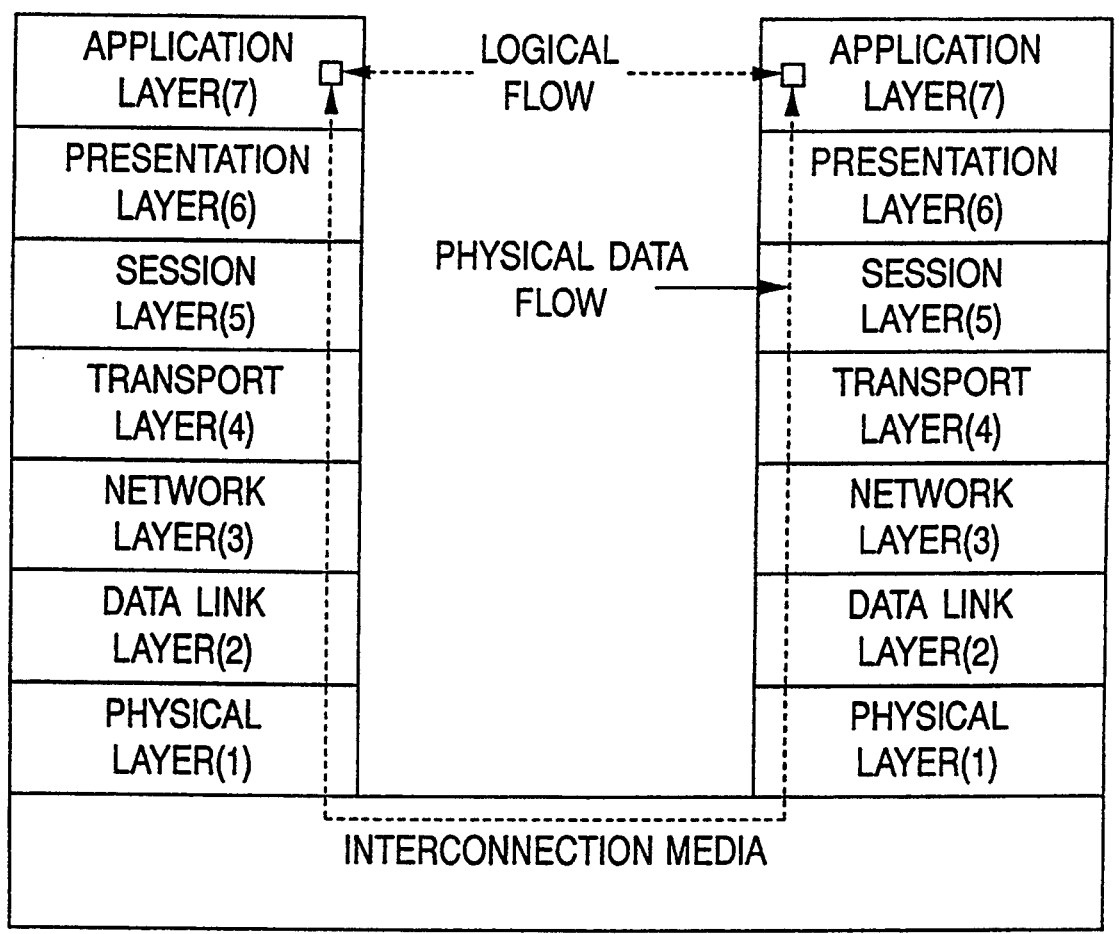
FIG. 2 is a drawing depicting operation of the OSI protocol.

The architecture of this invention is based on the concept that there exists at each node on a local area network an adapter or interface card or card set, and a host processor. The host processor typically implements layers three to seven of the ISO/OSI communications model, and application software modules or processes. The adapter or interface card set which can reside internal or external to the host processor connects the host processor to the physical media which interconnects the nodes of a LAN. The second layer of the ISO/OSI communications model is frequently divided into two sub-layers, the Data Link Control (DLC) sub-layer and the Media Access Control (MAC) sub-layer. The DLC sub-layer is normally implemented in software in the host processor, and the MAC sub-layer is normally implemented in firmware and hardware on a LAN adapter or LAN interface card or card set. The functionality of the MAC is expressed in state machine diagrams contained in the specification documents of each LAN protocol such at I.E.E.E. 802.3, 802.4, and 805.5; Fiber Distributed Data interface, etc.)

The clocks which are desired to be of a common value are the clocks contained in the host processor of the node. These clocks are used by application processes to create timestamps associated with events occurring in the system, and are the clocks which application processes use in an attempt to synchronize activities occurring on different host processors. For these purposes it is desirable to have all the host processor clocks operating with the same value of time. The time reference value that is distributed on the network is not necessarily the value of the real time clock at the host, but is a time reference value from which the current real time value can be generated in the units required by the host system. The time value proposed in this invention is derived from a clock-counter proposed to be implemented on the LAN adapter. A clock-counter is envisioned as a hardware count-up counter which increments one count on each positive (or negative) going edge of a controlling clock. As such the counter counts in units based on the period of the controlling clock. For example if the controlling clock operates at 10 Megahertz, the value contained in the clock-counter is the number of 0.1 microsecond periods which have occurred since the counter was last reset. A time value is generated by multiplying the value of the counter by the period (1/clock frequency, i.e. 0.1 microseconds in the above example) of the clock controlling the counter.

The time reference architecture of this invention requires that one node on each network is elected, or designated as the Time Reference Manager (TRM). Additional nodes on the network observe the performance of the Time Reference Manager and vie to execute the Time Reference Manager function should the original TRM fail to perform. The initial function of the TRM is to enable its local transmit state machine, implemented in the Media Access Control (MAC) sub-layer of layer 2, to periodically broadcast the Time Reference Protocol Data Unit (TR-PDU) on the LAN. The periodic broadcast of a TR-PDU is a new function proposed in this invention to be incorporated into the MAC implementation. The MAC state machines at other nodes on the LAN receive and process the Time Reference PDU frame as specified below; and forward the TR-PDU around the ring according to the defined protocol of the LAN.

A LAN PDU is composed of an information or data field and protocol-dependent address, control, and status fields. The detailed specification of the address, control, and status fields is contained in the LAN protocol specification documents for each different LAN protocol. One of the control fields, the Frame Control field, contains the codes which define to the MAC state machine the type of frame being communicated. The time reference architecture presented in this invention proposes to use one of the reserved or unused Frame Control field values to designate a frame as a Time Reference Protocol Data Unit.

Figure 3:
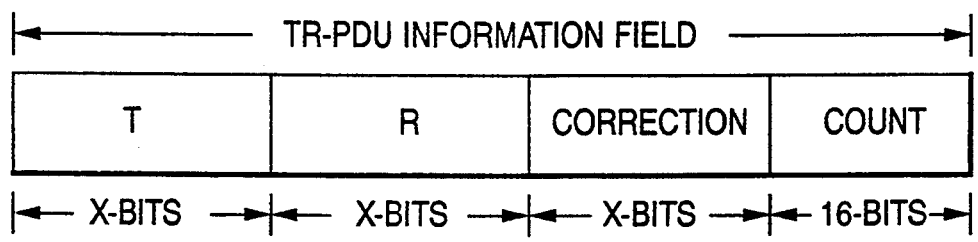
FIG. 3 shows the format of the Time Reference Protocol Data Unit information field which contains the necessary data parameters to implement the architecture contained in this invention.

The format of the information field of the TR-PDU proposed in this invention has four sub-fields as shown in FIG. 3. The four sub-fields of the TR-PDU are designated as T, R, Count, and Correction. The T (or Time sub-field) contains the value of the LAN adapter clock-counter at the time the TR-PDU frame is transmitted. The R sub-field contains a calculated difference value, the Count sub-field is used to determine the number of nodes on a ring, and the Correction sub-field contains a calculated value which is an approximation of the node-to-node transport delay of the ring. The remaining fields of the TR-PDU are as required by the LAN protocol (I.E.E.E. 802.3,4,5, Fiber Distributed Data Interface etc.).

The value of x, in FIG. 3, depends on the accuracy desired of the distributed time value, and the number of bits implemented in the clock-counter. x is generally less than or equal to the number of bits contained in the hardware clock-counter. If however, for field alignment purposes, x is larger than the number of bits in the hardware clock-counter then the bits in excess of the number of bits of the clock-counter must be zero when the clock counter value is placed into the T sub-field of the TR-PDU. An important factor in the consideration of how many bits to include in the clock-counter is how long in real time (i.e. maximum count multiplied by the clock period) it will take for the clock-counter to advance from its reset, or all 0 state, to the maximum count state just prior to rollover to the all 0 reset state. Frequently hardware clock-counters are implemented with 40–48 bits, not all of which need to be transmitted in the T sub-field of the TR-PDU. The accuracy of the time reference value is equal to $+/-0.5$ multiplied by the time value of the least significant bit of the T sub-field when x is less than or equal to the number of bits in the clock-counter. If x is larger than the number of bits used in the implementation of the clock-counter then the time value accuracy is $+/-0.5$ multiplied by the period of the clock controlling the incrementation of the clock-counter. For example if the hardware implements a 48 bit counter controlled by a 10 Megahertz clock then the accuracy of the time reference value if all 48 bits are used in the T sub-field of the TR-PDU is $+/-0.05$ microseconds. If only 40 bits of the 48 bit counter are used as the transmitted time reference value then the accuracy is $+/-(0.5)*(25.6 \text{ microseconds})$ which equals $+/-12.8$ microseconds. If only 32 bits of the 48 bit counter are used as the transmitted time reference value then the accuracy is $+/-(0.5)*(6553.6 \text{ microseconds})$ which equals $+/-0.32768$ milliseconds.

The time reference distribution architecture of this invention proposes additional functionality to that currently contained in MAC state machines. The new proposed MAC functionality consists of 1) controls and timers to support periodic distribution of a TR-PDU without upper layer intervention outside of enabling and disabling the time reference capability, 2) additions to the receive state machine to recognize and process a TR-PDU, 3) additions to the transmit state machine to recognize and process a TR-PDU, and 4) controls and processing for three new MAC entity service calls. These new MAC proposed service calls are named 1) Set Time Reference Period, 2) Enable Time Reference Function, and 3) Time Reference Parameters Request. The MAC sub-layer at the node which contains the enabled or selected Time Reference Manager is the controlling MAC for the distribution of the time reference value.

After the Time Reference Manager for the LAN is enabled or selected it subsequently issues a "Set Time Reference Period" Service Call and an "Enable Time Reference Function" service call to its local MAC entity. Receipt of these new service calls by the MAC entity in the order stated enables the new MAC entity time reference function to periodically generate and issue the TR-PDU. The "Set Time Reference Period" service call would enable the loading of a new MAC level timer which would trigger the periodic generation and transmission of the TR-PDU. The TR-PDU could be transmitted in a broadcast mode so that all nodes on the LAN will receive it, or it could be transmitted to an established Time Reference Group Address to which only those nodes which have a requirement to share a common time reference value with other nodes on the LAN would subscribe.

All non-Time Reference Manager nodes on a LAN wishing to receive the time reference parameters must issue a "Time Reference Parameter Request" service call to the local MAC entity.

As stated above this invention proposes modifications to the Media Access Control transmit and receive state machines. These state machines control all the transmission and reception of Protocol Data Units on a LAN. The proposed modifications to the receive state machine allow recognition of the Time Reference Frame by use of a currently unused value in the protocol-dependent Frame Control field. Additional MAC receive state machine modifications would cause the following actions to occur upon receipt of the Time Reference Frame:

1. Acquire the value of the local MAC sub-layer clock-counter (identified as T_mac in the discussion below) and append this value to the incoming T (referred to as T_in the following paragraphs), Count and Correction values and pass these values in the response to the Time Reference Parameters Request service call.

2a. At non-Time Reference Manager nodes: Increment the Count sub-field by one in the received TR-PDU.

2b. At the Time Reference Manager node: Acquire the value of the local host processor's clock-counter and discard the received TR-PDU which has now circulated once around the LAN.

3a. At non-Time Reference Manager nodes: Enqueue the received Time Reference Frame to the MAC transmit state machine for retransmission on the LAN. The information field of the enqueued TR-PDU would contain a blank T sub-field, the value in the R sub-field (referred to as R_out) would be calculated per Eq. 1, the Count sub-field would contain the count value as incremented in step 2 above, and an unmodified Correction sub-field.

$$R\_out = R\_in - T\_mac + T\_in \quad (Eq. 1)$$

where R—in designates the value contained in the R sub-field of the incoming Time Reference Frame, T—in designates the value contained in the T sub—field of the incoming Time Reference Frame. T—mac is the value of the adapter's MAC clock-counter when the TR-PDU was received (Step 1 above).

3b. At the Time Reference Manager node: Construct and transmit a new TR-PDU when the new MAC time reference timer expires, and reset the timer to the value specified in the Set Time Reference Period service call.

The MAC transmit state machine modifications proposed in this invention cause the transmit state machine to recognize, via the value in the Frame Control field, a request to transmit a Time Reference Frame (TR-PDU). Upon recognition that a TR-PDU is to be transmitted an additional modification to the MAC state machine would cause the following action to occur as the frame was being passed to the transmission medium:

1. Place the current value of the local MAC sub-layer clock-counter into the blank T sub-field of the Time Reference Frame enqueued by the MAC receive state machine.

At the Time Reference Manager node the value of R that is placed into the TR-PDU is calculated as the difference between the clock-counter of the Time Reference Manager's host processor and the local MAC clock-counter. This places a requirement on the overall architecture of the node such that the LAN adapter or interface card or card set can get access to the host processor's clock.

$$R\_out = T\_host - T\_mac \quad (Eq. 2)$$

It is assumed that the clock-counters in the MAC and the host processors are of the same size and are clocked from the same clock source or at least from clock sources of identical frequency and accuracy. Additional shifts and multiplications would be required in Eq. 2 if the clock-counters were of different size and/or if the clocking frequencies of the host and MAC clock-counters were different. The means by which the host acquires the value for its clock is not important in this architecture and the value may be acquired by any known way.

The TRM node MAC sub-layer processing associated with the periodic generation and transmission of the TR-PDU must set the Count sub-field in the TR-PDU to 1, calculate the transport-delay correction approximation and place this result into the Correction sub-field of the TR-PDU to be transmitted. On the first issuance of the TR-PDU the correction value shall be 0. On subsequent issuances of the TR-PDU the MAC sub-layer Time Reference entity must divide the difference $$T\_host - (T\_in + R\_in) \quad (Eq. 3)$$

by the Count sub-field to generate an integer approximation of the node-to-node transport delay, and place this value into the Correction sub-field. T_host is the value of the host clock-counter at the time the TR-PDU is received (i.e. completed a full excursion of the LAN). On short rings the T_host−(T_in+R_in) difference will be small; however, on 100+ node campus networks where the node separation might average 500 meters the transport delay of the media alone could be several tenths of a millisecond.

The T_mac, and R_out, values that are passed upward as the response to the Time Reference Parameters Request service call are used by a Time Reference process operating in the host processor, to calculate an r value used to bring the host's local clock-counter into agreement with Time Reference Manager's host clock-counter value as follows.

$$\begin{aligned}r &= R\_out + T\_mac - T\_host \\ &= (R\_in - T\_mac + T\_in) + T\_mac - T\_host \\ &= R\_in + T\_in - T\_host \\ &= T\_trm - T\_host \quad (Eq. 4)\end{aligned}$$

Where T_host denotes the value of the host processor's clock-counter, and T_trm denotes the value of the Time Reference Manager host processor's clock-counter. The r value is then used as a correction to the host processor clock-counter to create a network wide common time reference value as follows:

$$T\_host' = T\_host + r + Count*Correction \quad (Eq. 5)$$

EXAMPLE 1

Figure 4:
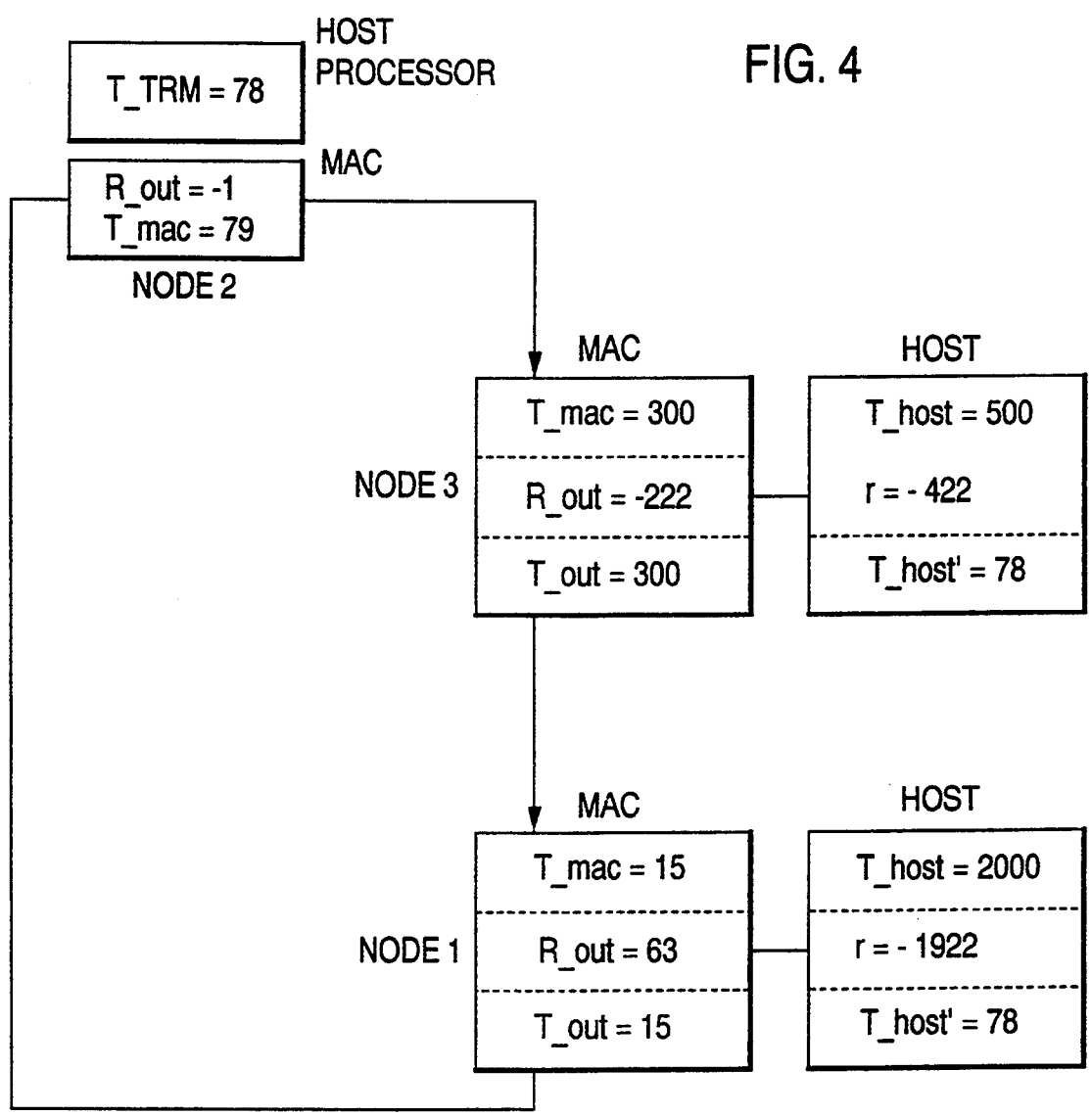
FIG. 4 is an example of the architecture operating on a three node LAN.

FIG. 4 is an illustration of the operation of the architecture presented by this invention for a three node ring. The magnitude of the clock-counter values are for illustration purposes only and are assumed to be in seconds. It is assumed that all the clock-counters, shown in this illustration, are incremented at the same frequency, that the TR-PDU is forwarded by each Transmit state machine with zero delay, and that all the transport delays are 0. Node 2 is the Time Reference Manager node. The detailed sequence of all the processing and TR-PDU messages that are generated for one cycle of the TR-PDU are as follows:

The assumed initial host and MAC clock-counter conditions are as follows:

|        | Host Processor Clock-counter | MAC Clock-counter |
|--------|------------------------------|-------------------|
| Node 1 | 2000                         | 15                |
| Node 2 | 78                           | 79                |
| Node 3 | 500                          | 300               |

Node 2 operating as Time Reference Manager generates a TR-PDU with the following sub-field values.

| | |
|---|---|
| R = R_out = 78 − 79 = −1 | per Eq. 2 |
| Count = 1 (Initial pass assumed) | |
| Correction = 0 (Initial pass assumed) | |
| Frame Control field = TR-PDU | |

The modified Transmit state machine places the value of the node 2 T_mac in the T sub-field as the T_out value = 79, and the TR-PDU information field as transmitted from node 2 and as received at node 3 appears as follows:

| node 2 out | T_out | R_out | Count | Correction |
|---|---|---|---|---|
|  | 79 | −1 | 1 | 0 |
| node 3 in | T_in | R_in | Count | Correction |
| At node 3 | | | | |

The modified Receive state machine generates the following values from the TR-PDU frame received from node 2:

$$R\_out = -1 - 300 + 79 = -222 \quad \text{per Eq. 1}$$

$$Count = 1 + 1 = 2$$

$$Correction = 0$$

and after enqueuing a TR-PDU to its local Transmit state machine passes T_mac=300, R_out=−222, Count=1, and Correction=0 as the Time Reference Parameters in response to the Time Reference Parameters Request service call issued previously.

The modified Transmit state machine upon recognition of the Frame Control field code=TR-PDU places the value of the node 3 T_mac in the T sub-field as the T_out value=300 and transmits the TR-PDU. The TR-PDU information field as transmitted from node 3 and as received at node 1 appears as follows:

| node 3 out | T_out | R_out | Count | Correction |
|---|---|---|---|---|
|  | 300 | −222 | 2 | 0 |
| node 1 in | T_in | R_in | Count | Correction |

The Time Reference process in the node 3 host processor upon receipt of the Time Reference Parameters calculates the r value as follows:

$$r = -222 + 300 - 500 = -422 \quad \text{per Eq. 4}$$

and then adjusts the node 3 host processor clock as follows $$T\_host' = 500 + (-422) + 1*0 = 78 \quad \text{per Eq. 5}$$

At node 1

The modified Receive state machine generates the following values from the TR-PDU frame received from node 3:

$$R\_out = -222 - 15 + 300 = 63 \quad \text{per Eq. 1}$$

$$Count = 2 + 1 = 3$$

$$Correction = 0$$

and after enqueuing a TR-PDU to its local Transmit state machine passes T_mac=15 along with R_out=63, Count=2, and Correction=0 as the Time Reference Parameters in response to the Time Reference Parameters Request service call issued previously.

The modified Transmit state machine upon recognition of the Frame Control field code=TR-PDU places the value of the node 1 T_mac in the T sub-field as the T_out value=15 and transmits the TR-PDU. The TR-PDU information field as transmitted from node 1 and as received at node 2 appears as follows:

| node 1 out | T_out | R_out | Count | Correction |
|---|---|---|---|---|
|  | 15 | 63 | 3 | 0 |
| node 2 in | T_in | R_in | Count | Correction |

The Time Reference process in the node 1 host processor upon receipt of the Time Reference Parameters calculates the r value as follows:

$$r = 63 + 15 - 2000 = -1922 \quad \text{per Eq. 4}$$

and then adjusts the node 1 host processor clock as follows $$T\_host' = 2000 + (-1922) + 2*0 = 78 \quad \text{per Eq. 5}$$

At node 2 the transport delay correction is calculated using Eq. 3 as follows

Correction = Integer part of $[(78-(15+63))/3] = 0$

If the R_out, r, and T_host' calculations were performed at node 2 upon receipt of the TR-PDU that the following results would be achieved:

| | |
|---|---|
| R_out = +63 − 79 + 15 = −1 | per Eq. 1 |
| r = −1 + 79 − 78 = 0 | per Eq. 4 |
| T_Host' = 78 + 0 + 3*0 = 78 | per Eq. 5 |

The host and MAC clock-counter conditions after one pass of the TR-PDU are as follows:

|        | Host Processor Clock-counter | MAC Clock-counter |
|--------|------------------------------|-------------------|
| Node 1 | 78                           | 15                |
| Node 2 | 78                           | 79                |
| Node 3 | 78                           | 300               |

EXAMPLE 2

Figure 5:
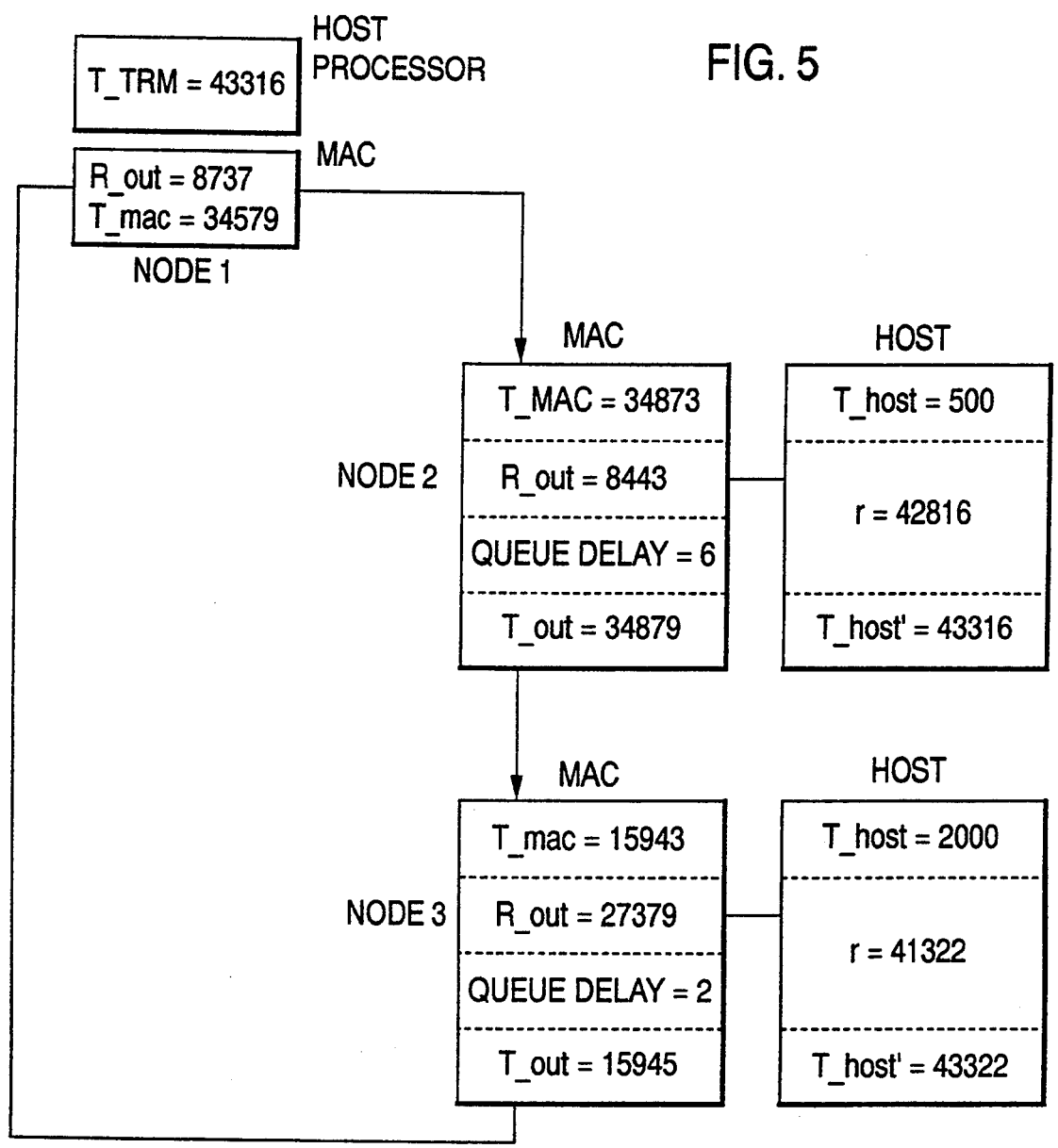
FIG. 5 is a second example of the time reference architecture executing on a three node ring.

FIG. 5 is an illustration of the operation of the architecture presented by this invention for a three node ring. The magnitude of the clock-counter values are for illustration purposes only and are assumed to be in milliseconds for this illustration. It is assumed that the clock-counters shown in this illustration are incremented at the same frequency, that at some nodes local clock-counter increments before the TR-PDU is transmitted, and that the transport delays are zero. In this example, node 1 is the Time Reference Manager node. The detailed sequence of all the processing and TR-PDU messages that are generated for one cycle of the TR-PDU are as follows:

The assumed initial host and MAC clock-counter conditions are as follows:

|        | Host Processor Clock-counter | MAC Clock-counter |
|--------|------------------------------|-------------------|
| Node 1 | 43316                        | 34579             |
| Node 2 | 500                          | 34873             |
| Node 3 | 2000                         | 15937             |

Node 1 operating as Time Reference Manager generates a TR-PDU with the following sub-field values.

R = R_out = 43316 − 34579 = 8737   per Eq. 2
Count = 1   (Initial pass assumed)
Correction = 0   (Initial pass assumed)
Frame Control field = TR-PDU The modified Transmit state machine places the value of the node 1 T_mac in the T sub-field as the T_out value=34579, and the TR-PDU information field as transmitted from node 1 and as received at node 2 appears as follows:

| node 1 out | T_out 34579 | R_out 8737 | Count 1 | Correction 0 |
|------------|-------------|------------|---------|--------------|
| node 2 in  | T_in        | R_in       | Count   | Correction   |

At node 2

The modified Receive state machine generates the following values from the TR-PDU frame received from node 1:

R_out=8737−34873+34579=8443   per Eq. 1

Count=1+1=2

Correction=0 and after enqueuing a TR-PDU to its local Transmit state machine passes T_mac=34873, R_out=8443, Count=1, and Correction=0 as the Time Reference Parameters in response to the Time Reference Parameters Request service call issued previously.

In this illustration it is assumed that there is a 6 time unit queueing delay in the Transmit state machine before the enqueued TR-PDU is actually transmitted. The modified Transmit state machine upon recognition of the Frame Control field code=TR-PDU places the value of the node 2 T_mac in the T sub-field as the T_out value=34879 and transmits the TR-PDU. The TR-PDU information field as transmitted from node 2 and as received at node 3 appears as follows:

| node 2 out | T_out 34879 | R_out 8443 | Count 2 | Correction 0 |
|------------|-------------|------------|---------|--------------|
| node 3 in  | T_in        | R_in       | Count   | Correction   |

The Time Reference process in the node 2 host processor upon receipt of the Time Reference Parameters calculates the r value as follows:

r=8443+34873−500=42816   per Eq. 4 and then adjusts the node 2 host processor clock as follows

T_host′=500+42816+1*0=43316   per Eq. 5

At node 3

The modified Receive state machine generates the following values from the TR-PDU frame received from node 1:

R_out=8443−15943+34879=27379   per Eq. 1

Count=2+1=3

Correction=0 and after enqueuing a TR-PDU to its local Transmit state machine passes T_mac=15943, R_out=27379, Count=2, and Correction=0 as the Time Reference Parameters in response to the Time Reference Parameters Request service call issued previously.

In this illustration it is assumed that there is a 2 time unit queueing delay in the Transmit state machine before the enqueued TR-PDU is actually transmitted. The modified Transmit The modified Transmit state machine upon recognition of the Frame Control field code=TR-PDU places the value of the node 3 T_mac in the T sub-field as the T_out value=15945 and transmits the TR-PDU. The TR-PDU information field as transmitted from node 3 and as received at node 1 appears as follows:

| node 3 out | T_out 15945 | R_out 27379 | Count 3 | Correction 0 |
|------------|-------------|-------------|---------|--------------|
| node 1 in  | T_in        | R_in        | Count   | Correction   |

The Time Reference process in the node 3 host processor upon receipt of the Time Reference parameters calculates the r value as follows:

r=27379+15943−2000=41322   per Eq. 4 and then adjusts the node 3 host processor clock as follows

T_host′=2000+41322+2*0=43322   per Eq. 5

At node 1 the transport delay correction is calculated using Eq. 3 as follows (the host clock having incremented by eight units during the transit around the LAN by the TR-PDU).

Correction = Integer part of $[(43324-(15945+27379))/3]=0$

If the R_out, r, and T_host' calculations were performed at node 1 upon receipt of the TR-PDU that the following results would be achieved:

R_out = 27379 − 34587 + 15945 = 8737   per Eq. 1 r = 8737 + 34587 − 43324 = 0   per Eq. 4

T_Host' = 43324 + 3*0 = 43324   per Eq. 5

The host and MAC clock-counter conditions after one pass of the TR-PDU are as follows:

|  | Host Processor Clock-counter | MAC Clock-counter |
|---|---|---|
| Node 1 | 43324 | 34587 |
| Node 2 | 43324 | 34881 |
| Node 3 | 43324 | 15945 |

What has been described is an architecture for the generation and distribution of a Time Reference value for providing a means to bring all the host processor nodes attached to a local area network to a common reference time value. It is to be understood by those skilled in the art that various departures can be made from the examples and implementation proposed without deviating from the spirit and the scope of the present invention.

What is claimed is:

1. A method for generating a Time Reference Value on a plurality of nodes of a ring topology local area network (LAN) implemented in an ISO/OSI communication model comprising the steps of:

at a local node performing the following steps implemented in a media access control (MAC) layer of the ISO/OSI communication model:

acquiring the value of a local clock-counter for use as a local clock time value;

appending the local clock time value to a time, count and correction value received on the LAN in a frame of a time reference protocol data unit (TR-PDU);

incrementing the count by one in the received time, count and correction value;

calculating a correction factor based on a time value correction algorithm;

retransmitting in response to a time reference request the incremented and corrected time, count and correction value in the TR-PDU; and at a time reference node performing the following steps implemented in a media access control (MAC) layer of the ISO/OSI communication model:

replacing a current Time Reference Value with a received time, count and correction value from a local node;

constructing and transmitting a new Time Reference Value in a modified TR-PDU; and resetting the clock-counter to a specified value in response to a set time reference period service call.

2. In an ISO/OSI communication model, a system for providing a Time Reference Value to a plurality of nodes on a ring topology local area network (LAN) comprising:

a Time Reference Manager implemented in a media access control (MAC) layer of the ISO/OSI communication model for controlling a transmit state machine and initiating communication bus requests on a communication bus, the Time Reference Manager broadcasting a Time Reference Value onto the LAN in a frame of a Time Reference Protocol Data Unit (TR-PDU);

a state machine implemented in the MAC layer for receiving the Time Reference Value on the LAN in the TR-PDU and periodically transmitting a processed Time Reference Value; and a local processor at a node of the LAN, the processor implemented in the MAC layer and receiving the broadcast Time Reference Value, incrementing it by one, calculating a correction factor and returning the processed Time Reference Value to the state machine for transmission on the ring topology local area network.

3. A system for distributing a uniform time reference for a plurality of data processors in a data communications network implemented in an ISO/OSI communication model having a network clock source, comprising:

a first node, the first node having a first network adapter coupled to the data communications network, which includes a first adapter clock counter coupled to said network clock source, said first node also having a first data processor coupled to said first network adapter, which includes a first processor clock counter coupled to said network clock source, for representing a reference time at said first node;

a second node, the second node having a second network adapter coupled to said data communications network, which includes a second adapter clock counter coupled to said network clock source, said second node also having a second data processor coupled to said second network adapter, which includes a second processor clock counter coupled to said network clock source, for representing the reference time at said second node;

said first node computing in a media access control (MAC) layer of the ISO/OSI communications model a first difference value as a difference between first processor clock counter value in said first processor clock counter and a first adapter clock counter value in said first adapter clock counter;

said first node forming in said MAC layer a first time reference data unit in a frame of a protocol data unit identified as a time reference-protocol data unit (TR-PDU) which includes said first adapter clock counter value and said first difference value and transmitting in said MAC layer said first time reference data unit over said data communications network to said second node;

said second node in said MAC layer computing in said MAC layer a second difference value from a sum of said first difference value and said first adapter clock counter value minus a second adapter clock counter value in said second adapter clock counter; and said second node computing in said MAC layer a second processor clock counter value for said second processor clock counter from a sum of said second difference value and said second adapter clock counter value.

4. The system for distributing a uniform time reference for a plurality of data processors of claim 3, which further comprises:
- a third node having a third network adapter coupled to said data communications network, which includes a third adapter clock counter implemented in the MAC layer, the third node coupled to said network clock source, said third node also having a third data processor coupled to said third network adapter, which includes a third processor clock counter coupled to said network clock source, for representing the reference time at said third node;
- said second node forming in said MAC layer a second time reference data unit which includes said second adapter clock counter value and said second difference value and transmitting said second time reference data unit over said data communications network to said third node in the TR-PDU frame;
- said third node computing in said MAC layer a third difference value from a sum of said second difference value and said second adapter clock counter value minus a third adapter clock counter value in said third adapter clock counter;
- said third node computing in said MAC layer a third difference value from a sum of said second difference value and said second adapter clock counter value minus a third adapter clock counter value in said third adapter clock counter; and
- said third node computing in said MAC layer a third processor clock counter value for said third processor clock counter from a sum of said third difference value and said third adapter clock counter value.

5. A method for distributing a uniform time reference for a plurality of data processors in a data communications network implemented in an ISO/OSI communications model having a network clock source, the network including a first node, the first node having a first network adapter coupled to the data communications network, which includes a first adapter clock counter implemented in a media access control (MAC) layer of the ISO/OSI communications model coupled to the network clock source, said first node also having a first data processor coupled to said first network adapter which includes a first processor clock counter coupled to said network clock source, for representing the reference time at said first node, the network further including a second node, the second node having a second network adapter coupled to said data communications network, which includes a second adapter clock counter implemented in the MAC layer coupled to said network clock source, said second node also having a second data processor coupled to said second network adapter, which includes a second processor clock counter coupled to said network clock source, for representing the reference time at said second node, the method comprising the steps performed in the MAC layer of:
- computing in said MAC layer at said first node a first difference value as a difference between a first processor clock counter value in said first processor clock counter and a first adapter clock counter value in said first adapter clock counter;
- forming in said MAC layer at said first node a first time reference data unit identified as a TR-PDU in a frame of a protocol data unit which includes a first adapter clock counter value and said first difference value and transmitting said first time reference data unit or TR-PDU over said data communications network to said second node;
- computing at said second node a second difference value from a sum of said first difference value and said first adapter clock counter value minus a second adapter clock counter value in said second adapter clock counter; and
- computing at said second node a second processor clock counter value for said second processor clock counter from a sum of said second difference value and said second adapter clock counter value.

* * * * *